United States Patent
Levi et al.

(10) Patent No.: US 11,003,920 B2
(45) Date of Patent: May 11, 2021

(54) DETECTION AND PLANAR REPRESENTATION OF THREE DIMENSIONAL LANES IN A ROAD SCENE

(71) Applicant: GM GLOBAL TECHNOLOGY OPERATIONS LLC, Detroit, MI (US)

(72) Inventors: Dan Levi, Kyriat Ono (IL); Noa Garnett, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 16/189,078

(22) Filed: Nov. 13, 2018

(65) Prior Publication Data

US 2020/0151465 A1    May 14, 2020

(51) Int. Cl.
    G06K 9/00    (2006.01)
    G05D 1/02    (2020.01)
    G06N 3/08    (2006.01)
    G06K 9/66    (2006.01)

(52) U.S. Cl.
    CPC ....... G06K 9/00798 (2013.01); G05D 1/0251 (2013.01); G06K 9/66 (2013.01); G06N 3/08 (2013.01)

(58) Field of Classification Search
    CPC .... G06K 9/00798; G06K 9/66; G05D 1/0251; G05D 1/00; G08G 1/167; G08G 1/00; G06T 2207/30256; G06T 2207/20084; G06T 7/12; B60W 20/00; G01C 21/00; G06N 3/0481; G06N 3/0454; G06N 3/08
    See application file for complete search history.

(56) References Cited

U.S. PATENT DOCUMENTS

| | | | | |
|---|---|---|---|---|
| 9,516,277 B2* | 12/2016 | Zhang | ............. | G06K 9/00798 |
| 10,311,324 B1* | 6/2019 | Kim | ............. | G06K 9/4604 |
| 10,318,824 B2* | 6/2019 | Zhang | ............. | G06K 9/4633 |
| 10,336,326 B2* | 7/2019 | Gurghian | ............. | G06K 9/00798 |
| 10,410,322 B2* | 9/2019 | Viswanathan | ....... | G06T 3/4046 |
| 10,410,352 B1* | 9/2019 | Kim | ............. | G06N 3/08 |
| 10,442,444 B1* | 10/2019 | Bando | ............. | B60W 40/09 |
| 10,551,846 B1* | 2/2020 | Kim | ............. | G06N 20/00 |
| 10,740,626 B2* | 8/2020 | Kang | ............. | G08G 1/167 |
| 2003/0030546 A1* | 2/2003 | Tseng | ............. | G06K 9/00805 340/425.5 |
| 2013/0063575 A1* | 3/2013 | Jia | ............. | H04N 13/327 13/327 |
| 2014/0104424 A1* | 4/2014 | Zhang | ............. | H04N 5/23238 348/148 |

(Continued)

*Primary Examiner* — Xuemei G Chen
(74) *Attorney, Agent, or Firm* — Cantor Colburn LLP (57) ABSTRACT

A vehicle, system for operating a vehicle and method of navigating a vehicle. The system includes a sensor and a multi-layer convolutional neural network. The sensor generates an image indicative of a road scene of the vehicle. The multi-layer convolutional neural network generates a plurality of feature maps from the image via a first processing pathway, projects at least one of the plurality of feature maps onto a defined plane relative to a defined coordinate system of the road scene to obtain at least one projected feature map, applies a convolution to the at least one projected feature map in a second processing pathway to obtain a final feature map, and determines lane information from the final feature map. A control system adjusts operation of the vehicle using the lane information.

20 Claims, 8 Drawing Sheets

(56) References Cited

U.S. PATENT DOCUMENTS

| | | | |
|---|---|---|---|
| 2017/0261602 A1* | 9/2017 | Olshansky | B60W 30/09 |
| 2017/0300763 A1* | 10/2017 | Zou | G06K 9/6271 |
| 2018/0074506 A1* | 3/2018 | Branson | G01S 15/931 |
| 2018/0173230 A1* | 6/2018 | Goldman-Shenhar | B60W 50/08 |
| 2019/0035101 A1* | 1/2019 | Kwant | G06N 3/0454 |
| 2019/0147254 A1* | 5/2019 | Bai | G05D 1/0231 |
| | | | 382/104 |
| 2019/0147255 A1* | 5/2019 | Homayounfar | G06N 3/0454 |
| | | | 701/23 |
| 2019/0295282 A1* | 9/2019 | Smolyanskiy | G01S 13/931 |
| 2020/0082182 A1* | 3/2020 | Lee | G06K 9/00825 |
| 2020/0090516 A1* | 3/2020 | Sert | G06K 9/4628 |
| 2020/0098135 A1* | 3/2020 | Ganjineh | G01C 21/32 |
| 2020/0126546 A1* | 4/2020 | Scaria | G10L 15/20 |
| 2020/0242373 A1* | 7/2020 | Mei | B60R 11/04 |
| 2020/0250440 A1* | 8/2020 | Campos | G06K 9/6256 |

\* cited by examiner

DETECTION AND PLANAR REPRESENTATION OF THREE DIMENSIONAL LANES IN A ROAD SCENE

INTRODUCTION

The subject disclosure relates to detection of lanes in a road scene. Commonplace technologies rely or machine-based systems and techniques to detect a lane in road scenes. Such systems and techniques can utilize machine-learning frameworks to infer road elements separately in an image domain. Then, heuristics or other types of empirical modeling are applied to combine those road elements into a lane or a group of lanes in the road scene. Further, such systems and techniques typically adopt an independent-sensor approach in which a group of lanes is detected utilizing a defined type of sensing modality (camera sensing, LIDAR sensing, or the like). Various groups of lanes detected in respective sensing modalities are usually fused after lane detection has been completed for each sensing modality. Not only can the detection and/or representation of a lane depend greatly on the types of heuristics applied to a group of detected road elements, but fusing sensor data a posteriori can diminish detection and/or representation fidelity. Poor fidelity in lane detection and/or representation can complicate or impede automated or autonomous operation of a vehicle circulating on a road. Accordingly, it is desirable to provide technologies for detection of lanes in a road scene.

SUMMARY

In one exemplary embodiment, a method of navigating a vehicle is disclosed. An image is obtained, the image indicative of a road scene at a sensor of the vehicle. A plurality of feature maps are generated from the image via a first processing pathway of a multi-layer convolutional neural network. At least one of the feature maps is projected onto a defined plane relative to a defined coordinate system of the road scene to obtain at least one projected feature map. A convolutions is applied to the at least one projected feature map in a second processing pathway of the multi-layer convolutional neural network to obtain a final feature map. The lane information is determined from the final feature map.

In addition to one or more of the features described herein, the image can include input data having a plurality of sensor modalities. In an embodiment in which the image further comprises a plurality of images, the first processing pathway to each of the plurality of images to obtain the plurality of feature maps for each of the images, projecting the plurality of feature maps onto the defined plane, combining the projected feature maps, and applying the convolution to the combined projected feature maps. The multi-layer convolutional neural network includes an encoder-decoder network. The final feature map is horizontally invariant and determining lane information further comprises determining a three-dimensional representation of the lanes. Projecting the at least one of the feature maps includes applying a homographic transformation to the at least one of the feature maps. The lane information is supplied to a control system configured to adjust operation of the vehicle using the lane information.

In another exemplary embodiment, a system for operating a vehicle is disclosed. The system includes a sensor and a multi-layer convolutional neural network. The sensor is configured to generate an image indicative of a road scene of the vehicle. The multi-layer convolutional neural network is configured to generate a plurality of feature maps from the image via a first processing pathway, project at least one of the plurality of feature maps onto a defined plane relative to a defined coordinate system of the road scene to obtain at least one projected feature map, apply a convolution to the at least one projected feature map in a second processing pathway to obtain a final feature map, and determine lane information from the final feature map.

In addition to one or more of the features described herein, the image includes input data from sensors having different sensor modalities. In one embodiment, the image includes a plurality of images, and the neural network is further configured to apply the first processing pathway to each of the plurality of images to obtain the plurality of feature maps for each of the plurality of images, project the plurality of feature maps onto the defined plane, combine the projected feature maps, and apply the convolution to the combined projected feature maps. The multi-layer convolutional neural network includes an encoder-decoder network. The final feature map is horizontally invariant, the system further comprising a lane representation module configured to determine a three-dimensional representation of the lanes from the final feature map. The system further includes a projection module configured to project the at least one of the feature maps by applying a homographic transformation to the at least one of the feature maps. The system further includes a control system configured to adjust operation of the vehicle using the lane information.

In yet another exemplary embodiment, the disclosure provides a vehicle is disclosed. The vehicle includes a sensor, a multi-layer convolutional neural network and a control system. The sensor is configured to generate an image indicative of a road scene of the vehicle. The multi-layer convolutional neural network is configured to generate a plurality of feature maps from the image via a first processing pathway, project at least one of the plurality of feature maps onto a defined plane relative to a defined coordinate system of the road scene to obtain at least one projected feature map, apply a convolutions to the at least one projected feature map in a second processing pathway to obtain a final feature map, and determine lane information from the final feature map. The control system is configured to adjust operation of the vehicle using the lane information.

In addition to one or more of the features described herein, the image includes input data from sensors having different sensor modalities. In an embodiment in which the image includes a plurality of images, the neural network is further configured to apply the first processing pathway to each of the plurality of images to obtain the plurality of feature maps for each of the plurality of images, project the plurality of feature maps onto the defined plane, combine the projected feature maps, and apply the convolution to the combined projected feature maps. The multi-layer convolutional neural network includes an encoder-decoder network. The final feature map is horizontally invariant, the system further comprising a lane representation module configured to determine a three-dimensional representation of the lanes from the final feature map. The vehicle further includes a projection module configured to project the at least one of the plurality of feature maps by applying a homographic transformation to the at least one of the plurality of feature maps.

The above features and advantages, and other features and advantages of the disclosure are readily apparent from the following detailed description when taken in connection with the annexed drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

The disclosure recognizes and addresses, in at least some embodiments, the issue of detection of a lane in a road scene. Embodiments of this disclosure include systems, vehicles, and methods that, individually or in combination, permit or otherwise facilitate detection of a group of lanes in a road scene. More specifically, yet not exclusively, a dual-pathway neural network (DNN) can operate on first feature maps derived from at least a world-view plane of the road scene and second feature maps based at least on a defined plane (e.g., top-view projection) within a world-view/global coordinate system. The DNN can jointly process the first feature maps and the second feature maps to generate a planar representation of a group of lanes in the road scene. While some embodiments of the disclosure are illustrated with reference to a road scene, the disclosure is not so limited. Indeed, the principles and practical elements disclosed herein can be applied to other types of thoroughfare scenes, such as a street scene, a highway scene, or the like.

Figure 1:
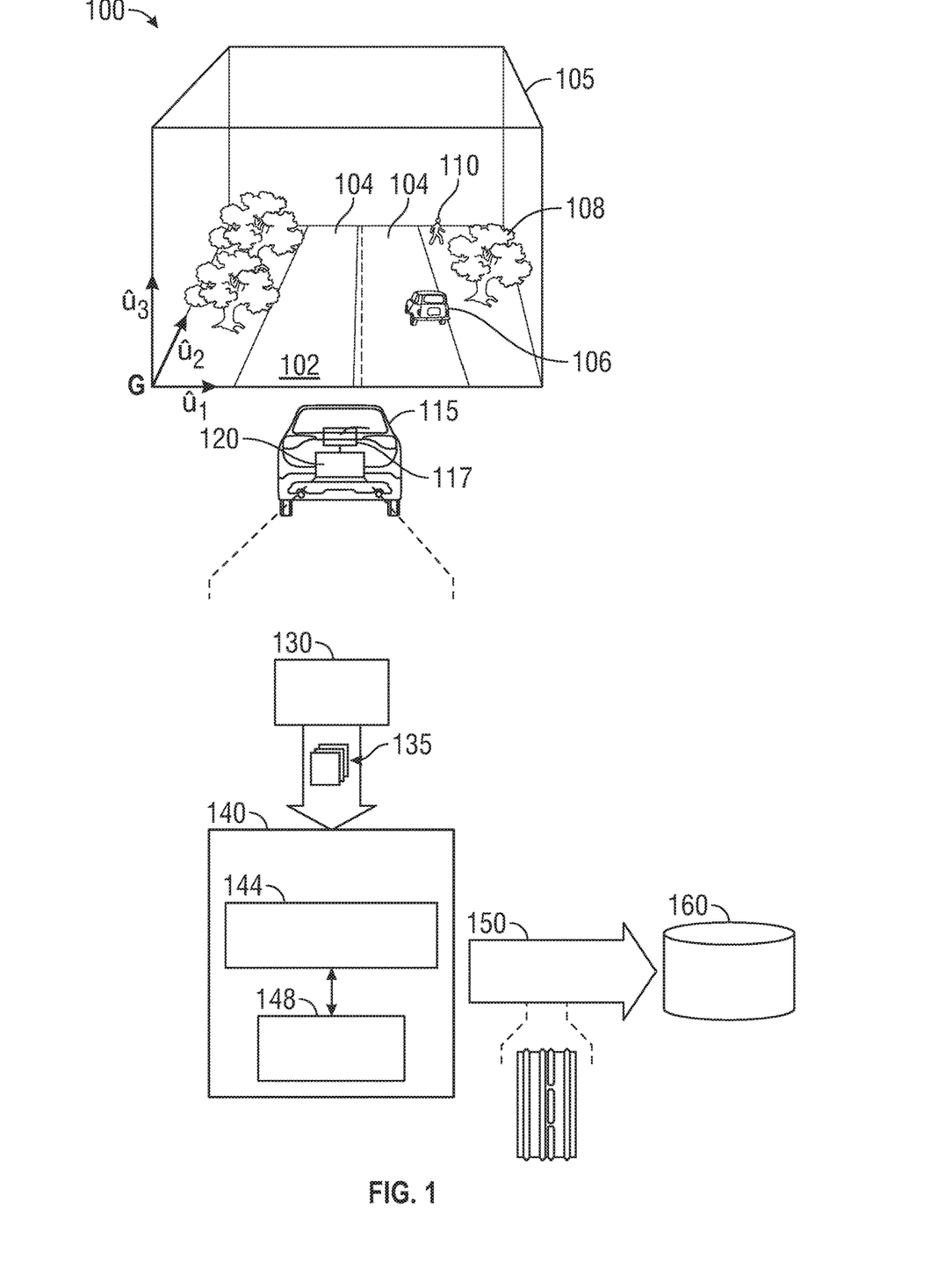
FIG. 1 depicts an operational environment for detection of a lane within a road scene, in accordance with an embodiment of the invention.

With reference to the drawings, FIG. 1 depicts an operational environment 100 for detection of a lane within a road scene 105, in accordance with an embodiment. The road scene 105 includes a volume defined by a global coordinate system G having defining vectors ($\hat{u}_1$, $\hat{u}_2$, $\hat{u}_3$), where $\hat{u}_1$ is a vector crossing the line of sight of a vehicle 152, $\hat{u}_2$ is a vector extending along the direction of travel of the vehicle 115 and $\hat{u}_3$ is a vector extending vertically.

The road scene 105 can include a road 102 having a group of lanes 104 (including, in some instance, one or more edge lanes). The road 102 also can include a sidewalk portion or a shoulder portion, either one of such portions being adjacent to the road. The road 102 also can include, for example, multiple objects located on the road and/or in a vicinity thereof. For instance, a first object can be a vehicle 106 (stationary or in motion) positioned relative to the vehicle 115 on the road 102; a second object can be a stationary structure 108, such as a tree, a utility post, a building, or the like; and a third object can include a human 110, either a pedestrian or an operator of a vehicle (motorized or otherwise).

Vehicle 115 can detect a lane 104 on the road 102. The vehicle 115 can detect the lane 104 while traversing the road 102 or while maneuvering (e.g., parking) on the road 102. The vehicle 115 also can, in some instances, detect the lane 104 while being stationary. The vehicle 115 includes a sensing platform 120 that can generate imaging data representative of the environment of the vehicle 115. The imaging data can be generated from signals detected by the sensing platform 120. The signals can include one or more types of electromagnetic (EM) signals (e.g., visible light, infrared light, or radio waves). More specifically, the sensing platform 120 can include a sensor system 130 that can detect EM signals at a defined rate f (a real number in units of frequency). Thus, imaging data (analog or digital) generated in response to detected EM signals can be organized in frames. A frame is, or includes, a data structure that contains one or more datasets generated in response to signals detected at a defined instant or during a defined period. As such, a frame corresponds to a defined instant during a detection interval.

The sensor system 130 can include multiple sensor devices that provide (e.g., generate and/or output) sensor signals. The sensor devices can be arranged or otherwise configured about the vehicle 115. In some embodiments, the multiple sensor devices can be homogenous and can generate an output sensor signal of a defined type. Thus, the sensor system 130 can generate data of a defined type. For example, each one of the multiple sensor devices can include a camera device that senses photons in the visible portion of the electromagnetic (EM) radiation spectrum, and the sensor system 130 can embody a camera system that generates imaging data representative or otherwise indicative of a region relative to the vehicle 115. As another example, each one of the multiple sensor devices can include light source devices (e.g., infrared laser devices) and photodetector devices, and the sensor system 130 can embody a light detection and ranging (LIDAR) sensor system that generates other imaging data representative or otherwise indicative of the road scene 105.

In other embodiments, the multiple sensor devices can be heterogeneous and can generate and output sensor signals of various types. For instance, the multiple sensor devices can include a first type of sensor devices and a second type of sensor devices. Thus, in one aspect, the sensor system 130 is constituted by sensor systems having respective types of sensor devices. Each sensor system embodies or constitutes a sensing system of a defined type—e.g., a camera system, a radar system, a LIDAR system, a sonar system, a thermal mapping system, or the like—that operates in a defined imaging modality. Accordingly, each sensor system can provide a defined type of imaging data representative of the road scene 105. Regardless of the specific sensing architecture/modality, the sensor system 130 can provide (e.g., send and/or make available) imaging data 135 indicative or otherwise representative of the road scene 105 at defined frames.

As is illustrated in FIG. 1, the sensing platform 120 includes a lane detection system 140 that can use at least a portion of the imaging data 135 to identify a lane 104 within the road scene 105, on a defined plane Π within the global coordinate system G. In some embodiments, the defined plane Π corresponds to a top-view projection of the road scene 105. In other words, the defined plane Π is a plane defined by vectors $\hat{u}_1$ and $\hat{u}_2$ (i.e., orthogonal to vector $\hat{u}_3$). More specifically, the lane detection system 140 includes a dual-pathway neural network (DNN) module 144 and a projection module 148 for transformation images between vantage points. The DNN module 144 and projection module 148 can output lane information representative of a group of lanes identified on the defined plane Π. This output can be used to process imaging data 135 obtained by sensors system 130 to obtain planar lane representations 150 that can be used to determine lane information 160. The lane information 160 can be retained as one or more data structures containing the planar lane representations 150.

The vehicle 115 includes a control system 117 communicatively coupled to the lane detection system 140. The control system 117 can receive or access data from the lane detection system 140 such as lane information 160 and can augment, automate or otherwise control the vehicle 115 to navigate the road 102 based on the lane information 160, for example, to remain within a lane 104, etc.

Figure 2:
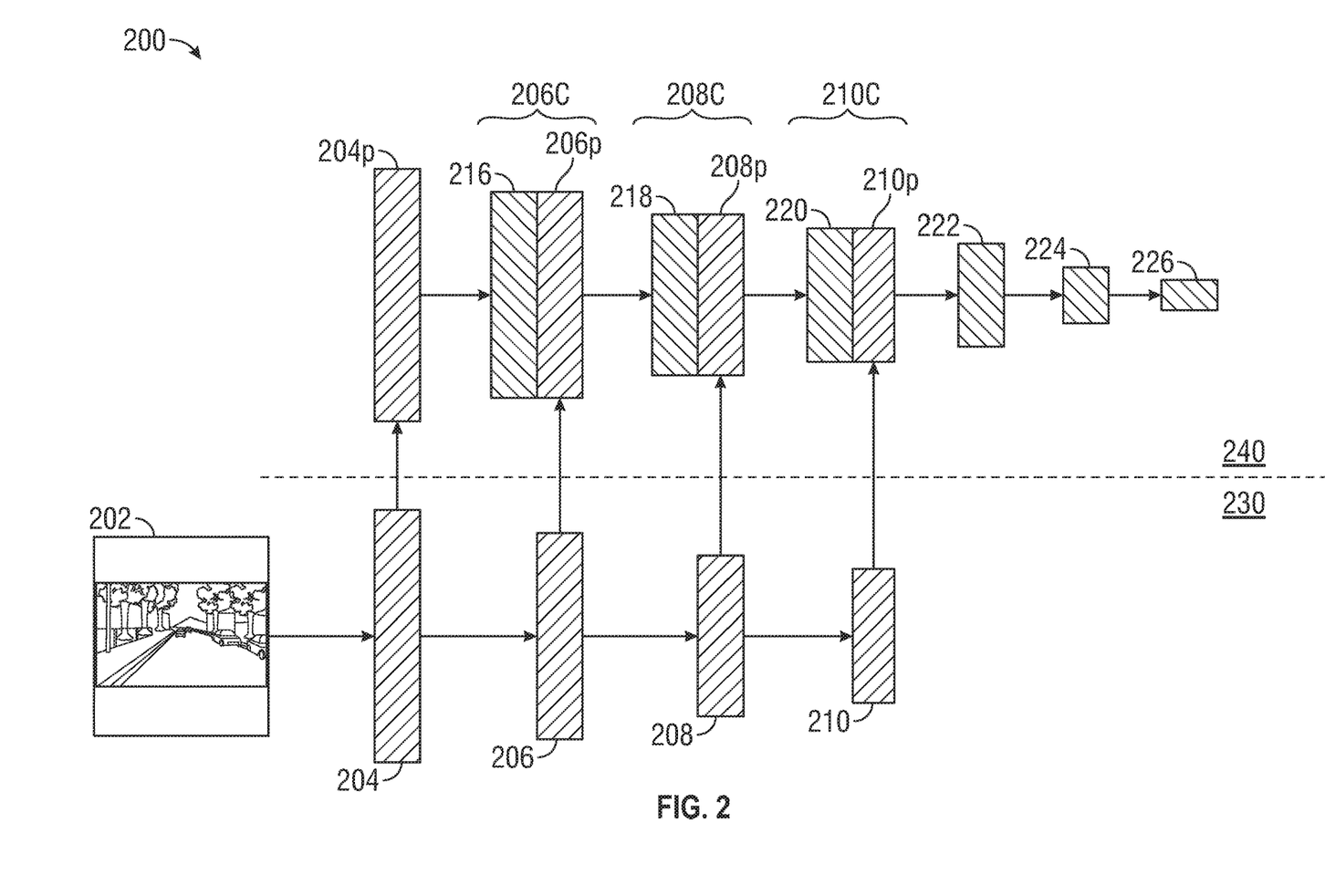
FIG. 2 illustrates an operational architecture of a dual neural network and projection module of the lane detection system of FIG. 1.

FIG. 2 illustrates an operational architecture of the DNN 200 and projection module 148 of the lane detection system 140. The DNN 200 includes a first processing pathway 230 and a second processing pathway 240. The first pathway 230 is used to determine feature maps in a first domain (e.g., the world-view domain) based on images obtained from sensors of the sensor system 130 having the viewpoint within the world-view coordinate system. The second pathway NN module 240 operates on feature maps within a second domain or top-view domain as seen from a top-view vantage point or bird's eye view vantage point of the road scene 105, FIG. 1, such as plane Π. A feature map can be a three-dimensional tensor indicating channel and x, y coordinates in an image. A homographic transformation is used to obtain features maps in the top-view domain from feature maps obtained in the world-view domain.

The first processing pathway 230 includes a convolutional neural network (CNN) that generates respective feature maps during the first-pathway. First processing pathway 230 shows an illustrative image 202 obtained from the sensor system 130, FIG. 1 and a first feature map 204 obtained from the image 202. The first feature map is provided to the CNN of the first processing pathway 230, which applies a convolution to the first feature map 204 to obtain a second feature map 206. Continuing this process, convolution of the second feature map 206 generates a third feature map 208 and convolution of the third feature map 208 generates a fourth feature map 210.

The projection module 148, FIG. 1 transforms a first point within a plane corresponding to a world view of the road scene 105 into a second point within the defined plane Π. More concretely, the projection module 148 transforms a point p in a feature map generated by the first processing pathway 230 into a point p' within the defined plane Π. The projection module 148 can transform p into p' by applying a defined homographic transformation that maps the world view of the road scene 105 onto the defined plane Π. Therefore, the projection module 148 can receive a feature map from the first processing pathway 230 and can project the feature map onto the defined plane Π, thus generating a projected feature map in the second processing pathway 240.

The homographic transformation is applied to each of the feature maps 204, 206, 208, 210 in the world-view domain to generate projected feature maps in the bird's-eye view domain. (The homographic transformations are indicated by vertical arrows extending from features maps 204, 206, 208, and 210). Homographic transformation of first feature map 204 generates first projected feature map 204p, homographic transformation of second feature map 206 generates second projected feature map 206p, homographic transformation of third feature map 208 generates third projected feature map 208p and homographic transformation of fourth feature map 210 generates further projected feature map 210p. While four feature maps are show in FIG. 2 for illustrative purposes, any number of feature maps can be created using the CNN along the first pathway 230.

In the second processing pathway 240, convolution of the first projected feature map 204p generates a second top-view feature map 216 within the top-view domain 240. The second top-view feature map 216 represents a convolution of a homographic transformation of the first feature map 204. Meanwhile, the second projected feature map 206p represents a homographic transformation of a convolution of the first feature map 204. The second top-view feature map 216 is combined or concatenated with the second projected feature map 206p in order to obtain a combined feature map 206c. A convolution is then performed on the combined feature map 206c in order to generate a third top-view feature map 218. The third top-view feature map 218 is combined or concatenated with the third projected feature map 208 to form a combined feature map 208c and a convolution is performed on the combined feature map 208c to obtain a fourth top-view feature map 220.

The fourth top-view feature map 220 is combined or concatenated with the fourth projected feature map 210p to form combined feature map 210c. In the top-view domain, the convolutions can continue from the combined feature map 210c in the second processing pathway 240 without further concatenation steps, extending the number of feature maps in the top-view domain beyond that of the world-view domain. These additional convolutions reduce the y-dimension of the three-dimensional tensor thereby creating a two-dimensional tensor defined by an indicating channel and an x-coordinate. In the illustrative DNN of FIG. 2, subsequent convolutions in the second processing pathway 240 produces fifth top-view feature map 222, sixth top-view feature map 224 and seventh top-view feature map 226. A lane within the road scene 105 can be determined from the top-view feature map 226.

Figure 3:
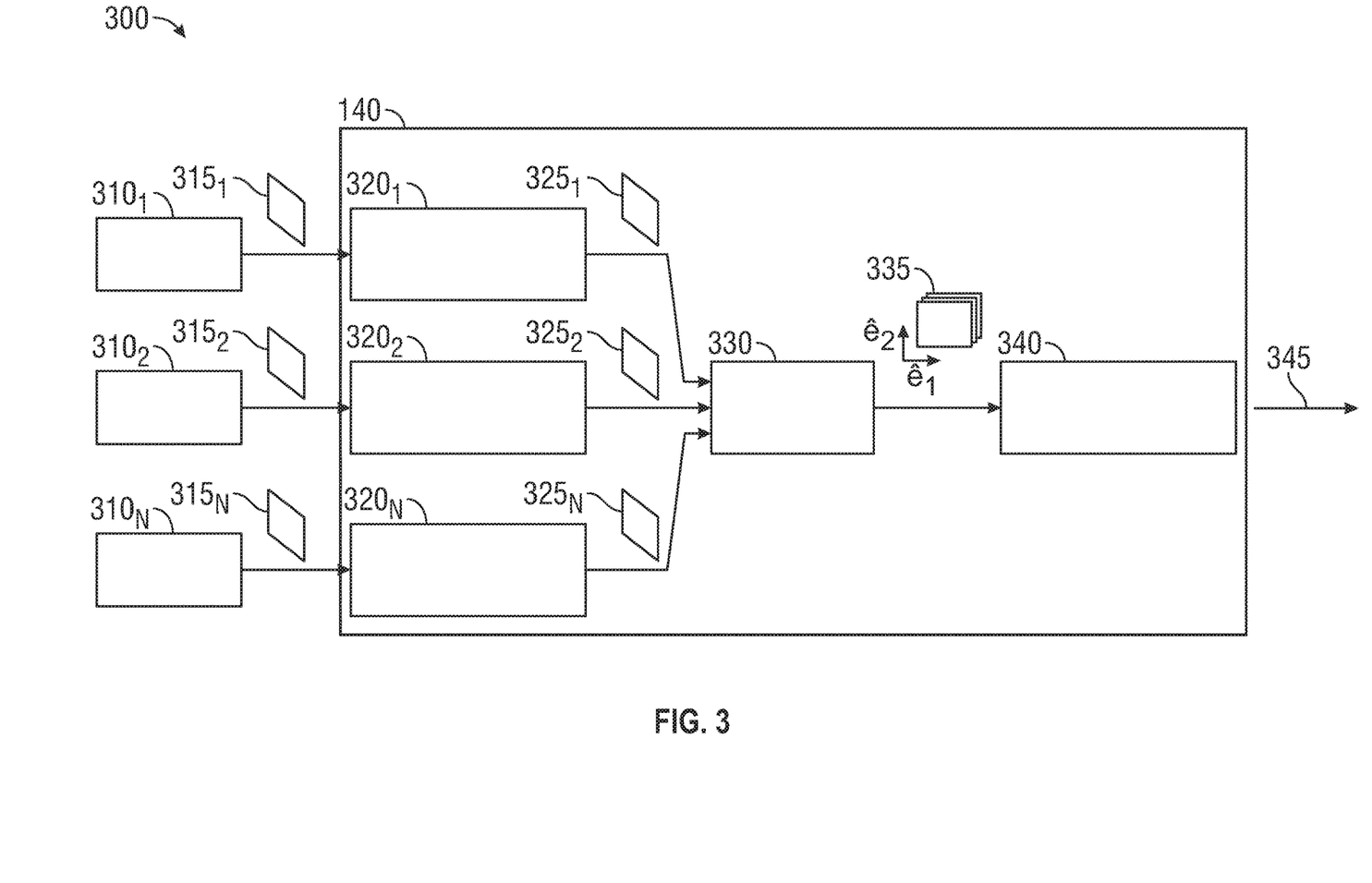
FIG. 3 schematically depicts a lane detection system for detection and planar representation of a lane within road scenes using imaging data from sensors having different sensing modalities.

FIG. 3 schematically depicts a system 300 for a lane detection system 140, FIG. 1 for detection and planar representation of a lane within road scenes using imaging data from sensors having different sensing modalities. The data from each sensor is fused into a common two-dimensional (2D) coordinate system ($\hat{e}_1$, $\hat{e}_2$). The 2D coordinate system is orthogonal and permits representing a position vector within a top-view plane (e.g., the defined plane Π).

The system 300 includes multiple sensor systems generally having different sensing modalities, including a sensor system $310_1$, a sensor system $310_2$, . . . , and a sensor system $310_N$. Each one of the multiple sensor systems can provide (e.g., send and/or make available) a defined type of input data or image representative of a road scene (e.g., road scene 105 in FIG. 1) at a defined frame. In one embodiment, the sensor system $310_1$ provides an image $315_1$; the sensor system $310_2$ provides an image $315_2$, . . . , and the sensor system $310_N$ provides an image $315_N$. In one embodiment, the sensor system $310_1$, sensor system $310_2$, and sensor system $310_N$ embody or constitute a camera system, a LIDAR system, and a radar system, respectively. In some embodiments, the sensing platform 120, FIG. 1 can have only two sensor systems, e.g., sensor system $310_1$ (e.g., a camera system) and sensor system $310_2$ (e.g., a LIDAR system).

The lane detection system 140 can receive images $315_1$-$315_N$ from the sensors $310_1$-$310_N$. The DNN of the lane detection system 140 includes separate first processing pathways dedicated to each image, and a single second processing pathway that operates on the fusion of the data from the first processing pathways. In the illustrated system 300, the lane detection system 140 includes first-pathway NN module $320_1$, first-pathway NN module $320_2$, . . . , and first-pathway NN module $320_N$. Each of the first-pathway NN modules $320_1$-$320_N$ receives respective input data or images $315_1$-$315_N$ and operates on the received images $315_1$-$315_N$. Operating on a received image can permit or otherwise facilitate, in some embodiments, semantic segmentation of a road scene (e.g., road scene 105). As such, each one of the first-pathway NN modules $320_1$-$320_N$ can include, for example, a CNN having multiple layers that generate respective feature maps $325_1$-$325_N$ in response to operating on a received image. Accordingly, each one of the first-pathway NN modules $320_1$-$320_N$ can generate respective feature maps $325_1$-$325_N$. Each feature map $325_1$-$325_N$ results from operation at a layer of the CNN corresponding to the respective first-pathway NN module $320_1$-$320_N$. As the sensor systems $310_1$, . . . , $310_N$ can include various input devices (e.g., camera system, LIDAR system, a radar system, etc.), the first-pathway NN modules $320_1$, . . . , $320_N$ associated with these sensor systems $310_1$, . . . , $310_N$ can include first-pathway NN modules suited for semantic segmentation of the particular input data or image (e.g., camera system, LIDAR system, a radar system, etc.).

To implement the second pathway NN module 340, the projection module 330 receives feature maps $325_1$-$325_N$, and transforms each feature map $325_1$-$325_N$ in the group into a projected feature map onto a defined plane in the 2D coordinate system ($\hat{e}_1$, $\hat{e}_2$) using the homographic transformation discussed herein. The projection module 148 fuses the projected feature maps into a consolidated projected feature map 335 relative to the defined plane and provides the consolidated projected feature map 335 to second-pathway NN module 340. In some embodiments, the second-pathway NN module 340 includes a CNN configured (e.g., defined and/or trained) to identify a lane on a defined plane Π in the 2D coordinate system ($\hat{e}_1$, $\hat{e}_2$) based at least on the consolidated projected feature map 335. Output of the second-pathway NN module 340 can include lane information 345 (e.g., data and/or metadata) representative of a group of lanes identified on the defined plane Π.

Figure 4:
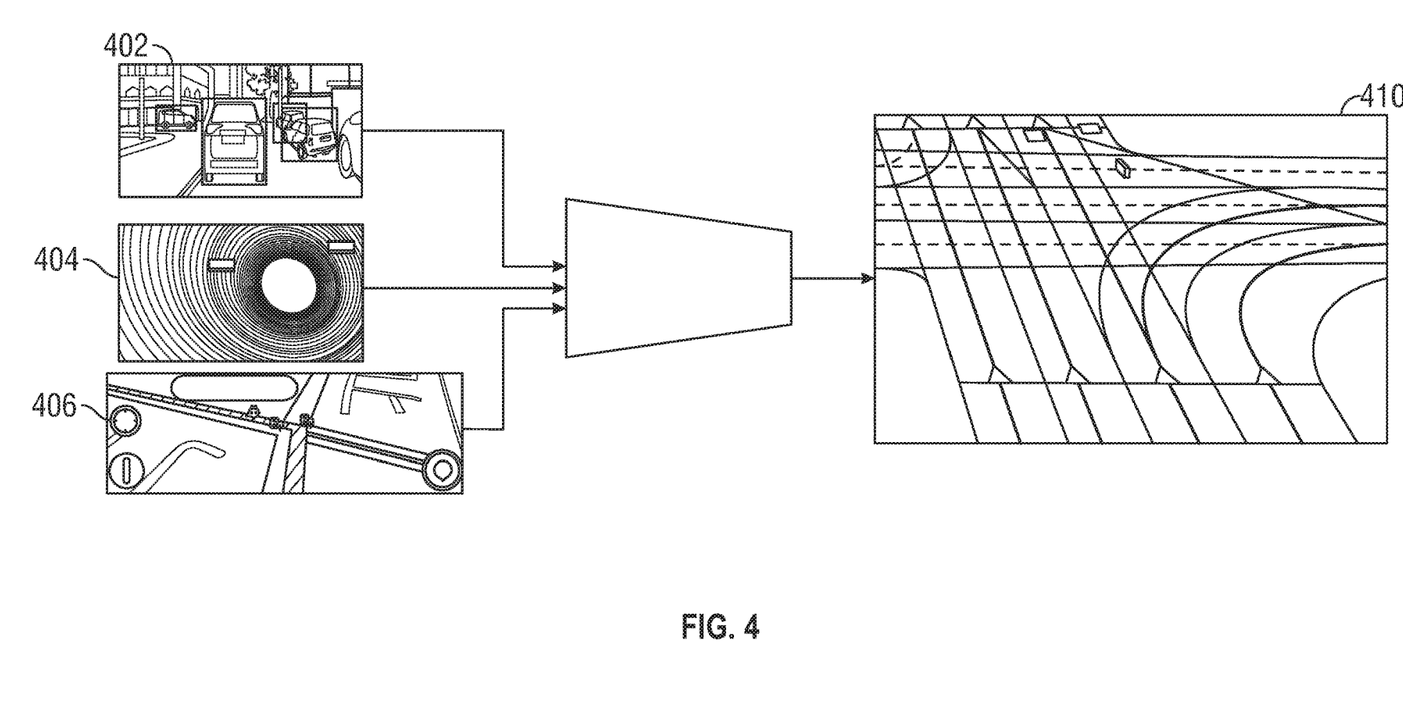
FIG. 4 illustrates a result of implementing the lane information system discussed with respect to FIG. 3.

FIG. 4 illustrates a result of implementing the lane information system 140 discussed with respect to FIG. 3. The images 402, 404 and 406 from sensors having different sensing modalities are combined to determine a bird's-eye view 410 that combines information from all three of the images 402, 404 and 406.

Figure 5:
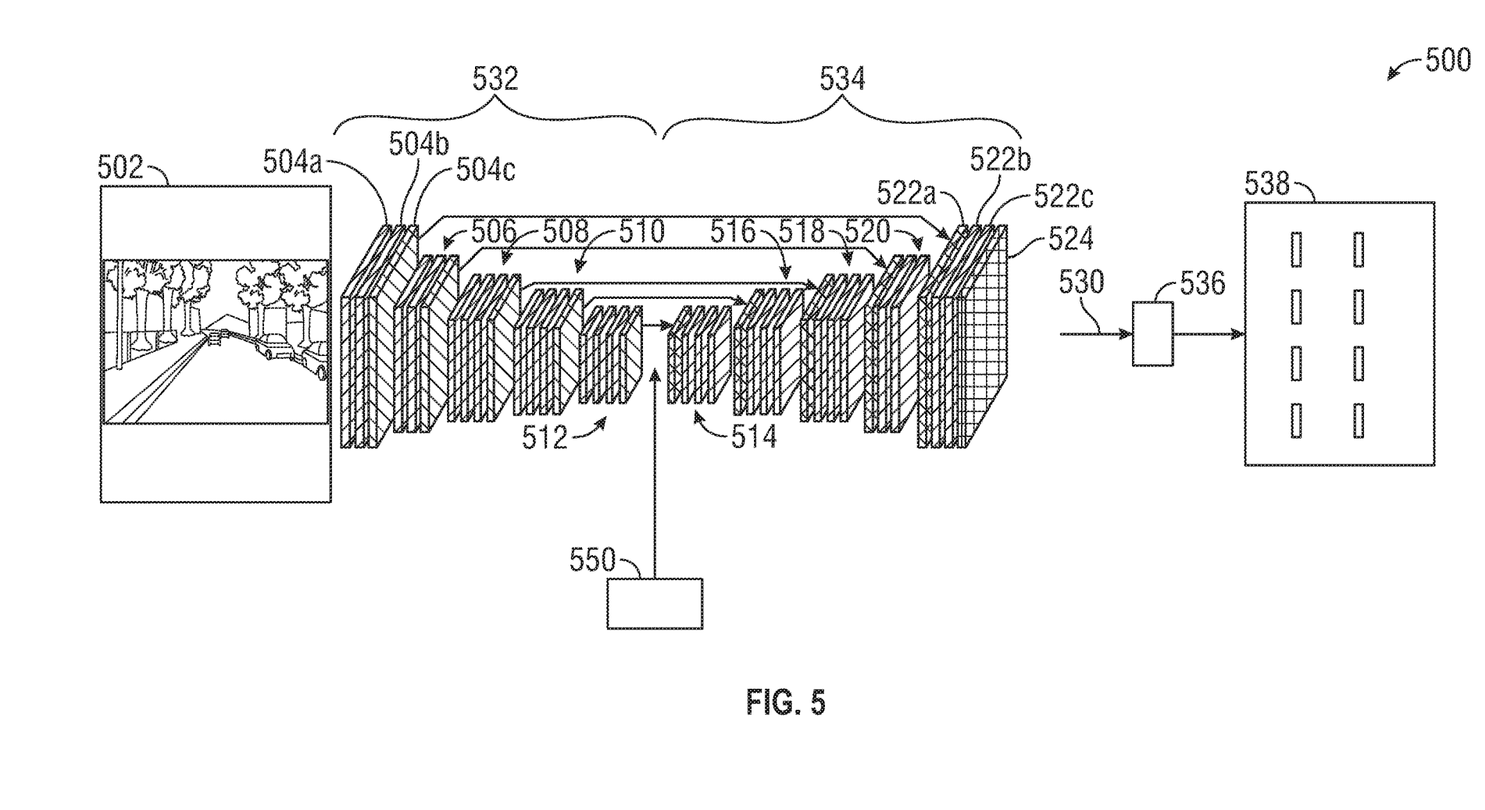
FIG. 5 schematically depicts a system for determining lane information at a lane information system using an encoder-decoder network.

FIG. 5 schematically depicts a system 500 for determining lane information at a lane information system 140, FIG. 1 using an encoder-decoder network. The encoder-decoder system 500 receives image 502 representative of a road scene in a world-view coordinate system. The encoder-decoder system 500 includes a convolutional encoder-decoder having an encoder network 532 and a decoder network 534. A homographic transformation module 550 transforms at least one feature map formed in the encoder network 532 to form a corresponding bird's eye view feature map in the decoder network 534 by projecting the feature maps onto the defined plane Π.

The encoder network 532 generates a sequence of feature maps based on the image 502. The encoder network 532 generates a feature map 504a from the image 502. Additional feature maps are generated by applying a convolution followed by a batch renormalization and application of a rectified linear-non-linearity (ReLU). In particular, convolution, batch renormalization and ReLU are applied to feature map 504a to obtain feature map 504b. The encoder network 532 shows feature maps 506 obtained from sub-sampling of feature maps 504, feature maps 508 obtained from sub-sampling of feature maps 506, feature maps 510 obtained from sub-sampling of feature maps 508 and feature maps 512 obtained from sub-sampling of feature maps 510.

At each stage max-pooling indices are captured and stored. Max-pooling is performed to achieve translation invariance over small spatial shifts in the input image. Max-pooling captures and stores boundary information in the encoder features map prior to sub-sampling the feature map. Max-pooling indices indicate the locations of the maximum feature values in a window of an encoder feature map.

The decoder network 534 regenerates the images in order to determine a feature map 522c suitable for semantic segmentation. Feature maps 516 are regenerated from feature maps 514, feature maps 518 are regenerated from feature maps 516, feature maps 520 are regenerated from feature maps 518 and feature maps 522a, 522b and 522c are regenerated from feature maps 520. The pooling indices obtained at each stage in the encoder network 532 are used at the comparable stage of the decoder network 534 in order to obtain feature maps 522a, 522b and 522c that can be provided to a classification layer 524 for semantic segmentation. As an example, the pooling indices 504c from the initial stage of the encoder network 532 is provided to the final stage of the decoder network 534.

The classification layer 524 determines confidence score (c; a real number) indicative of whether a lane is present the final feature maps 522a, 522b and 522c. The system 500 also can include a lane representation module 536 that determines a respective group of reference points along a direction orthogonal to the direction in which the defined portions are oriented. The lane representation module 536 outputs a bird's eye view image 538 of a region as projected onto the defined plane Π; the bird's eye view image 538 including lane markings or lane delimiters. Operation of the lane representation module 536 is described with respect to FIG. 6.

Figures 6, 7A:
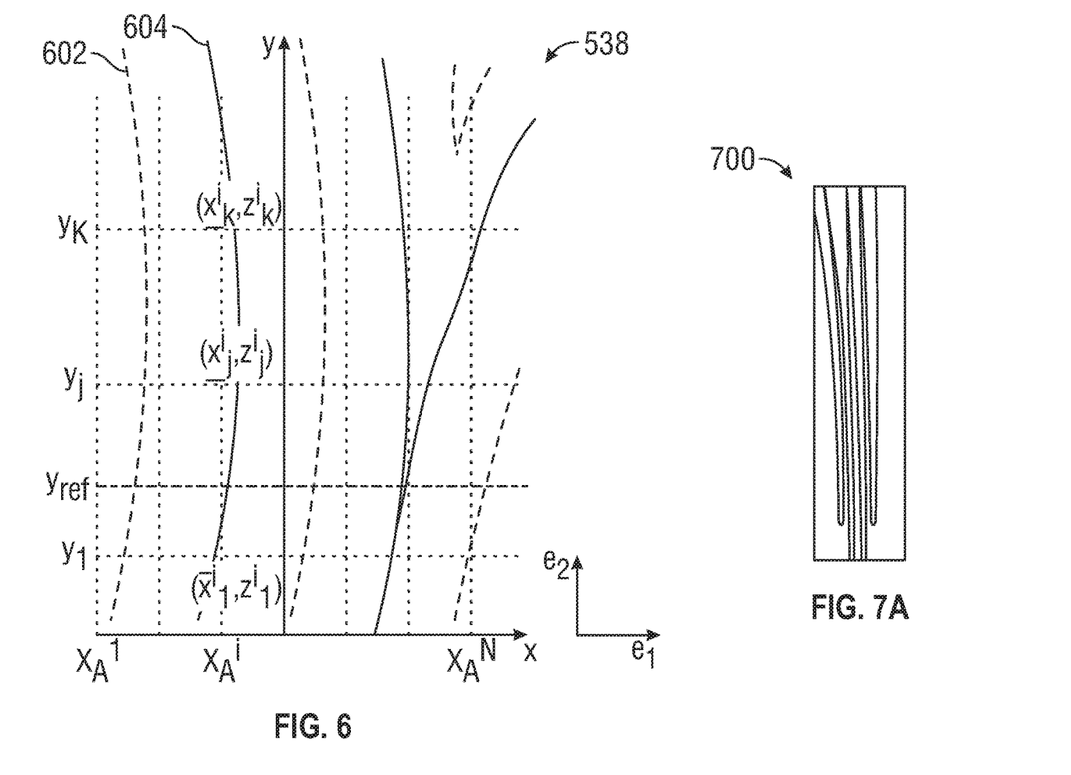
FIG. 6 illustrates a method of locating lane markings in a bird's eye view as indicated by the defined plane, as performed by a lane representation module.
FIG. 7A presents a top-view representation illustrating multiple lanes that can be determined by a lane representation module.

FIG. 6 illustrates the bird's eye view image 538 of lane markings as indicated by the defined plane Π. The lane representation module 536 of FIG. 5 determines or locates the lane markings using the bird's eye view image 538. The bird's eye view image 538 includes a first axis $e_1$ along the horizontal direction and a second axis $e_2$ along the vertical direction. The lane representation module 536 partitions the first axis $e_1$ into a set of N anchors $\{X_1, X_2, \ldots, X_N\}$, with the anchor along the first axis $e_1$ and corresponding to a column extending along the second axis $e_2$. A set of K locations $\{y_1, y_2, \ldots, y_K\}$ are defined along the second axis $e_2$. Within each column $\{X_1, X_2, \ldots, X_N\}$, the lane representation module 536 determines whether there are any lane markings (e.g., delimiters 602, centerlines 604) within the column corresponding to the locations $\{y_1, y_2, \ldots, y_K\}$. The lane representation module 536 determines horizontal and elevation for lane markings $\{(x_1,z_1), (x_2,z_2), \ldots, (x_K,z_K)\}$ that correspond to the locations $\{y_1, y_2, \ldots, y_K\}$ to define a set of three-dimensional points through which the lane marking passes. The values of $\{x_1, x_2, \ldots, x_K\}$ are horizontal offsets relative to the anchor position. Therefore, the coordinates of the three-dimensional points can be written as $\{(X_n+x_1, y_1, z_1), (X_n+x_2, y_2, z_2), \ldots, (X_n+x_K, y_K, z_K)\}$. In addition, for each anchor or corresponding column, a confidence score c for the markings is determined. The lane representation module 536 compares the confidence score c to a defined threshold value $c_{th}$. For bins in which the confidence score c is greater than or equal to the defined threshold value $c_{th}$, the lane representation module 536 accepts the markings as being within the column and determines a parametric polynomial representation of the lane within the defined plane Π using at least the group of reference points within the bin. Although only three locations and corresponding road coordinates are shown in FIG. 6, any number of locations and road coordinates can be selected in alternative embodiments. Using three or more locations and road coordinates allows fitting polynomials through the road coordinates in order to determine lanes in three-dimensions. The process of determining the lane markings is horizontally invariant.

Figure 7B:
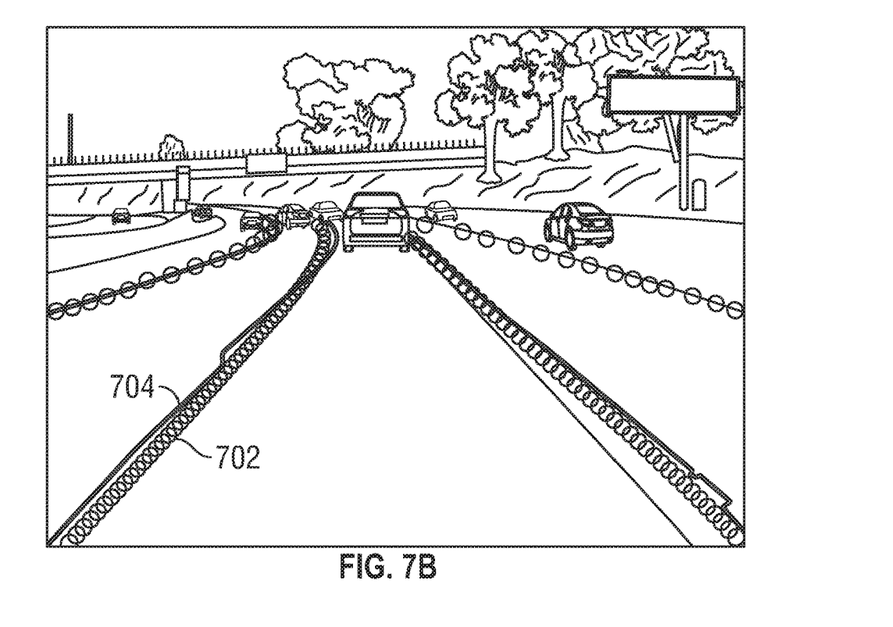
FIG. 7B illustrates a projection of the lanes of FIG. 7B onto ground-truth data.

FIG. 7A presents a top-view representation 700 illustrating multiple lanes that can be determined by the lane representation module 536 of FIG. 5. The lane detection system 140 projects the group of lanes in FIG. 7A onto a world view of the road scene including the detected group of lanes. FIG. 7B illustrates the results of such a projection, overlapping ground-truth data for the lanes in the road scene (open circles 702) and projected detected lanes (thick lines 704).

Figure 8A:
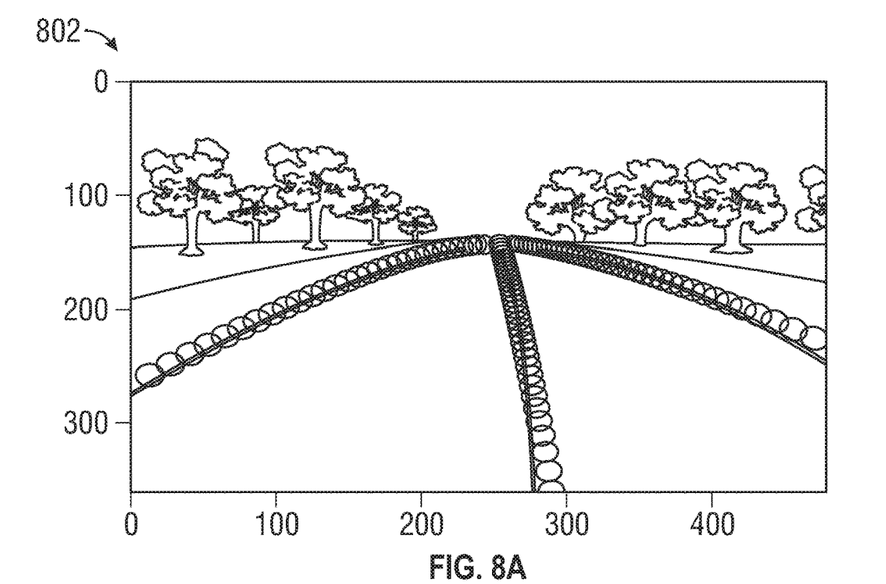
FIG. 8A shows an image of a road scene used to produce three-dimensional lane representations.
Figure 8B:
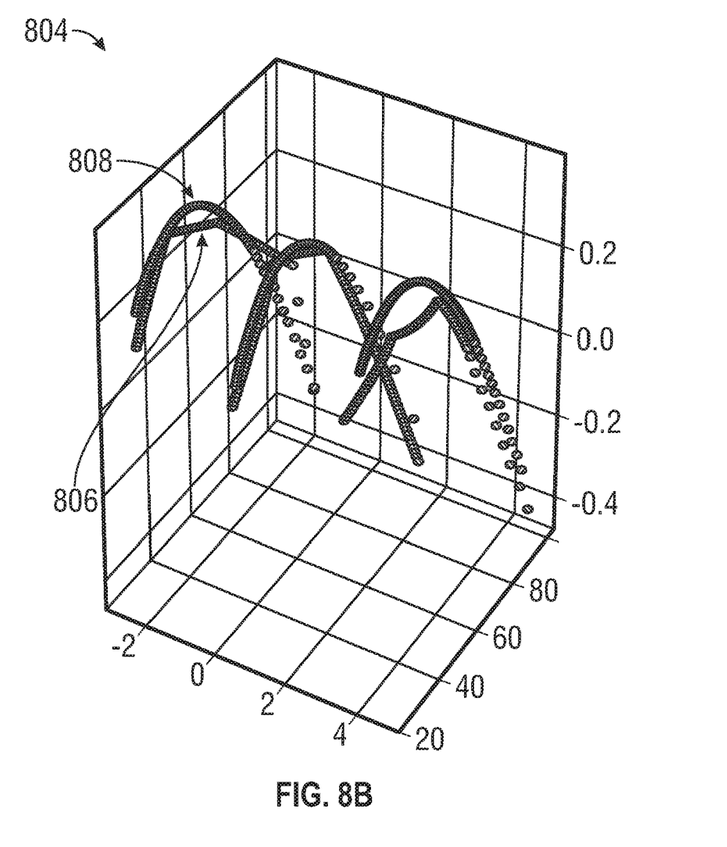
FIG. 8B shows a three-dimensional graph of the image of FIG. 8A.

FIG. 8 illustrates a result of three-dimensional road lane determination using the methods disclosed herein. FIG. 8A shows an image 802 of a road scene that is used to produce three-dimensional lane representations. FIG. 8B shows a three-dimensional graph 804 of the image 802 of FIG. 8A. The ground-truth lane 806 markings are shown in the three-dimensional graph 804. Also shown in the three-dimensional graph 804 are the three-dimensional lane representations 808 obtained using the methods disclosed herein.

Figure 9:
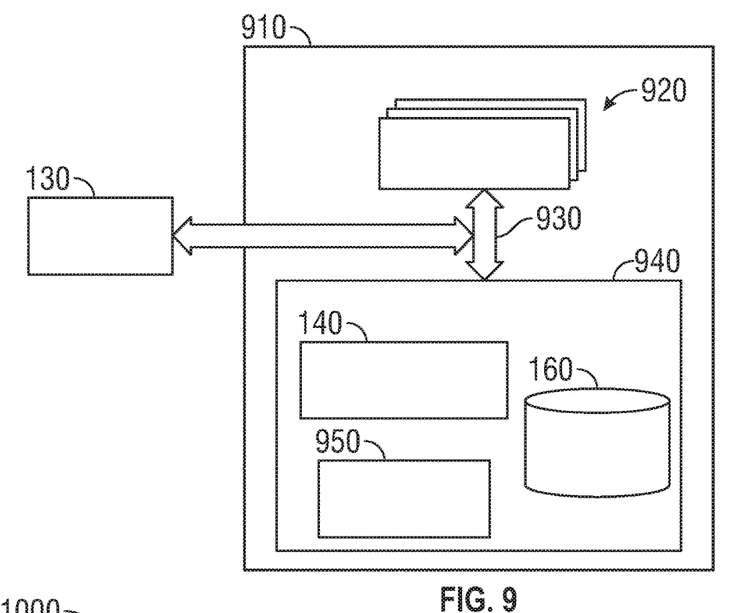
FIG. 9 presents a block diagram of an example of a computing system to detect and represent a lane within a road scene, in accordance with aspects of this disclosure.

FIG. 9 presents a block diagram of an example of a computing system 910 to detect and represent a lane within a road scene, in accordance with aspects of this disclosure. The computing system 910 can include one or more processors 920 and one or more memory devices 940 (generically referred to as memory 940) that include machine-accessible instructions (e.g., computer-readable and/or computer-executable instructions) that can be accessed and executed by at least one of the processor(s) 920. In one example, the processor(s) 920 can be embodied in or can constitute a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), a combination thereof, or the like. In some embodiments, the processor(s) 920 can be arranged in a single computing apparatus (e.g., an electronic control unit (ECU), and in-car infotainment (ICI) system, or the like). In other embodiments, the processor(s) 920 can be distributed across two or more computing apparatuses (e.g., multiple ECUs; a combination of an ICI system and one or several ECUs; or the like).

The processor(s) 920 can be functionally coupled to the memory 940 by means of a communication structure 930. The communication structure 930 is suitable for the particular arrangement (localized or distributed) of the processor(s) 920. In some embodiments, the communication structure 930 can include one or more of bus architectures, such an Ethernet-based industrial bus, a controller area network (CAN) bus, a Modbus, other types of fieldbus architectures, or the like.

The memory 940 includes the lane detection system 140. As such, machine-accessible instructions (e.g., computer-readable and/or computer-executable instructions) embody or otherwise constitute the lane detection system 140. The machine-accessible instructions are encoded in the memory 940 and can be arranged in components that can be built (e.g., linked and compiled) and retained in computer-executable form in the memory 940 (as is shown) or in one or more other machine-accessible non-transitory storage media. At least one of the processor(s) 920 can execute the lane detection system 140 to cause the computing system 910 to detect and/or represent a group of lanes within a road scene in accordance with aspects of this disclosure.

Similarly, the memory 940 also can retain or otherwise store the control system 950. As such, machine-accessible instructions (e.g., computer-readable and/or computer-executable instructions) embody or otherwise constitute the control system 950. Again, the machine-accessible instructions are encoded in the memory 940 and can be arranged in components that can be built (e.g., linked and compiled) and retained in computer-executable form in the memory 940 (as is shown) or in one or more other machine-accessible non-transitory storage media. At least one of the one or more processors 920 can execute the control system 950 to cause the computing system 910 to implement a control process to adjust or otherwise control the operation of the vehicle 115, FIG. 1, for example, or other types of vehicles. To that end, in one aspect, the control process can utilize or otherwise rely on a representation of one or more lanes generated by the lane detection system 140.

While not illustrated in FIG. 9, the computing system 910 also can include other types of computing resources (e.g., interface(s) (such as I/O interfaces; controller devices(s); power supplies; and the like) that can permit or otherwise facilitate the execution of the software components. To that point, for instance, the memory 940 also can include programming interface(s) (such as application programming interfaces (APIs)), an operating system, firmware, and the like.

Figure 10:
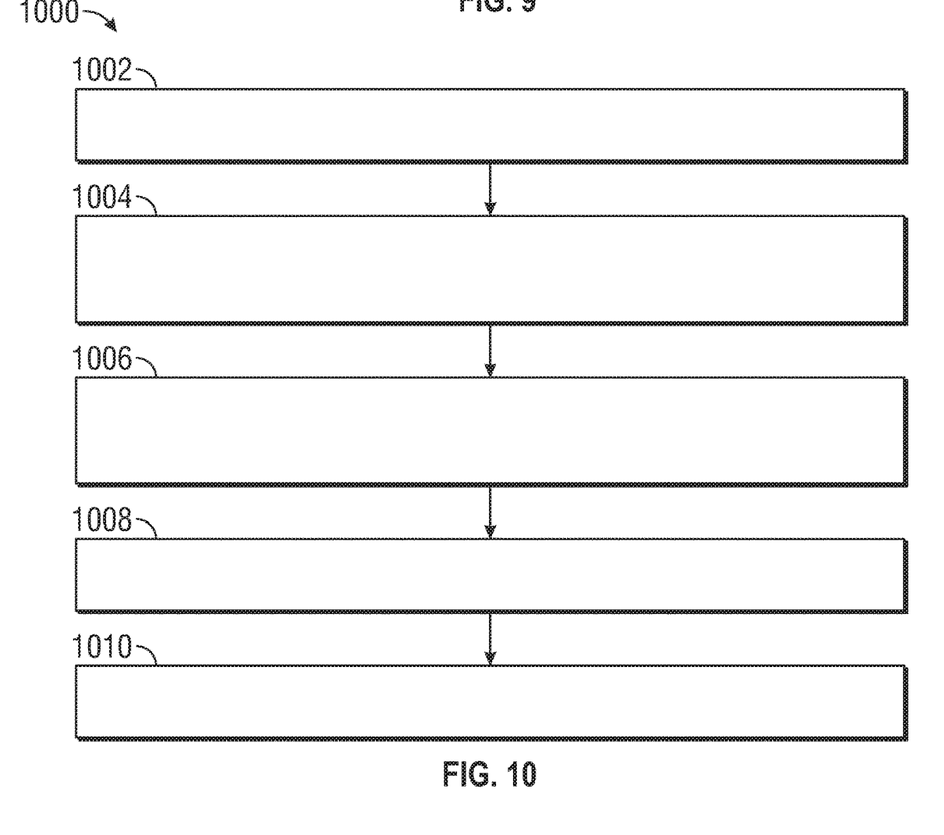
FIG. 10 shows a flowchart illustrating a method for detecting a lane in a road scene in an embodiment.

FIG. 10 shows a flowchart illustrating a method 1000 for detecting a lane in a road scene in an embodiment of the invention. At block 1002, an image indicative of a road scene of the vehicle is obtained at a sensor of the vehicle. The image can be a single image or a plurality of images. The plurality of images can be obtained from sensors having different sensor modalities. At block 1004, a multi-layer convolution neural network is applied to the image, wherein a first processing pathway of the neural network generates a plurality of feature maps from the image. At block 1006, the plurality of feature maps are projected onto a defined plane relative to a defined coordinate system of the road scene to obtain projected feature maps. At block 1008, a second processing pathway of the neural network applies convolutions to the projected feature maps to obtain a final feature map. At block 1010, lane information is determined from the final feature map.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of navigating a vehicle, comprising:
   obtaining an image indicative of a road scene at a sensor of the vehicle;
   generating, via a first processing pathway of a multi-layer convolutional neural network, a plurality of feature maps from the image;
   projecting a feature map selected from the plurality of feature maps onto a defined plane relative to a defined coordinate system of the road scene to obtain a projected feature map;
   combining the projected feature map with a top-view feature map generated in a second processing pathway of the multi-layer convolutional neural network to obtain a combined feature map;
   applying a convolution to the combined feature map in the second processing pathway of the multi-layer convolutional neural network to obtain a final feature map; and
   determining lane information from the final feature map.

2. The method of claim 1, wherein the image includes input data having a plurality of sensor modalities.

3. The method of claim 1, wherein the image further comprises a plurality of images, further comprising applying the first processing pathway to each of the plurality of images to obtain the plurality of feature maps for each of the images, projecting the plurality of feature maps onto the defined plane, combining the projected feature maps, and applying the convolution to the combined projected feature maps.

4. The method of claim 1, wherein the multi-layer convolutional neural network includes an encoder-decoder network.

5. The method of claim 1, wherein the final feature map is horizontally invariant and determining lane information further comprises determining a three-dimensional representation of the lanes.

6. The method of claim 1, wherein projecting the feature map comprises applying a homographic transformation to the feature map.

7. The method of claim 1, further comprising adjusting an operation of the vehicle using the lane information.

8. A system for operating a vehicle, comprising:
   a sensor of the vehicle configured to generate an image indicative of a road scene of the vehicle;
   a processor configured to operate a multi-layer convolutional neural network to:
     generate a plurality of feature maps from the image via a first processing pathway;
     project a feature map selected from the plurality of feature maps onto a defined plane relative to a defined coordinate system of the road scene to obtain a projected feature map;
     combine the projected feature map with a top-view feature map generated in a second processing pathway of the multi-layer convolutional neural network to obtain a combined feature map;
     apply a convolution to the combined feature map in the second processing pathway to obtain a final feature map; and
     determine lane information from the final feature map.

9. The system of claim 8, wherein the image includes input data from sensors having different sensor modalities.

10. The system of claim 8, wherein the image further comprises a plurality of images, the neural network being further configured to:
    apply the first processing pathway to each of the plurality of images to obtain the plurality of feature maps for each of the plurality of images;
    project the plurality of feature maps onto the defined plane;
    combine the projected feature maps; and
    apply the convolution to the combined projected feature maps.

11. The system of claim 8, wherein the multi-layer convolutional neural network includes an encoder-decoder network.

12. The system of claim 8, wherein the final feature map is horizontally invariant and the processor is further configured to determine a three-dimensional representation of the lanes from the final feature map.

13. The system of claim 8, wherein the processor is further configured to project the feature map by applying a homographic transformation to the feature map.

14. The system of claim 8, wherein the processor is further configured to adjust an operation of the vehicle using the lane information.

15. A vehicle, comprising:
    a sensor of the vehicle configured to generate an image indicative of a road scene of the vehicle;
    a processor configured to operate a multi-layer convolutional neural network to:
      generate a plurality of feature maps from the image via a first processing pathway;
      project a feature map selected from plurality of feature maps onto a defined plane relative to a defined coordinate system of the road scene to obtain a projected feature map;
      combine the projected feature map with a top-view feature map generated in a second processing pathway of the multi-layer convolutional neural network to obtain a combined feature map;
      apply a convolution to the combined feature map in the second processing pathway to obtain a final feature map;
      determine lane information from the final feature map; and
      adjust operation of the vehicle using the lane information.

16. The vehicle of claim 15, wherein the image includes input data from sensors having different sensor modalities.

17. The vehicle of claim 15, wherein the image further comprises a plurality of images, the neural network being further configured to:

apply the first processing pathway to each of the plurality of images to obtain the plurality of feature maps for each of the plurality of images;
project the plurality of feature maps onto the defined plane;
combine the projected feature maps; and
apply the convolution to the combined projected feature maps.

18. The vehicle of claim 15, wherein the multi-layer convolutional neural network includes an encoder-decoder network.

19. The vehicle of claim 15, wherein the final feature map is horizontally invariant, and the processor is further configured to determine a three-dimensional representation of the lanes from the final feature map.

20. The vehicle of claim 15, wherein the processor is further configured to project the feature map by applying a homographic transformation to the feature map.

* * * * *